United States Patent
Deppert et al.

(10) Patent No.: US 6,186,512 B1
(45) Date of Patent: Feb. 13, 2001

(54) PISTON RING

(75) Inventors: Norbert Deppert, Gochsheim; Peter Wölki, Mönchengladbach; Robert Wieser, Viersen, all of (DE)

(73) Assignee: Mannesmann Sachs AG, Schweinfurt (DE)

( * ) Notice: Under 35 U.S.C. 154(b), the term of this patent shall be extended for 0 days.

(21) Appl. No.: 09/307,572

(22) Filed: May 7, 1999

(30) Foreign Application Priority Data

May 7, 1998 (DE) .............................................. 198 20 405

(51) Int. Cl.⁷ ........................................................ F16F 9/36
(52) U.S. Cl. ............................................. 277/434; 310/311
(58) Field of Search ................................... 277/434, 310, 277/311, 909, 300; 188/322.18, 322.16; 100/269.21, 269.18

(56) References Cited

U.S. PATENT DOCUMENTS 3,645,174 * 2/1972 Prasse ................................... 277/178
5,655,634 * 8/1997 Grundei et al. .................. 188/322.18

FOREIGN PATENT DOCUMENTS

| 36 11 288 A1 | 10/1987 | (DE) | .............................. | B60G/13/08 |
| 44 11 006 A1 | 12/1994 | (DE) | .................................. | F16J/9/06 |
| 44 10 996 C1 | 6/1995 | (DE) | .................................. | F16F/9/32 |
| 195 01 792 C2 | 6/1997 | (DE) | .................................. | F16J/1/02 |

* cited by examiner

Primary Examiner—Terry Lee Melius
Assistant Examiner—Frederick Conley
(74) Attorney, Agent, or Firm—Cohen, Pontani, Lieberman & Pavane

(57) ABSTRACT

A mounted piston ring for a piston/cylinder unit. The piston ring covers a circumferential surface of the piston and seals it off from the cylinder. The piston ring has a width which is greater than the height of the circumferential surface, so that there is an axially projecting length of the piston ring relative to the piston. This axially projecting length is shaped into a spring end which is axially supported on a top side of the piston. One spring end having a circular-arc-shaped transition which is designed to be between 90° and 180°, and which spring end comes to bear on the first top side of the piston. The other spring end having an annular bearing surface, comes to bear in the region of the opposite second top side of the piston. In this region the other spring end, with respect to the shaping angle, is adapted to the angle between the circumferential surface and the second top side.

5 Claims, 3 Drawing Sheets

PISTON RING

BACKGROUND OF THE INVENTION

1. Field of the Invention

The present invention relates to pistons in an internal combustion engine and more particularly to a piston ring for a piston.

2. Description of the Related Art

DE 195 01 792 C2 describes a piston with a piston ring being designed especially for the specific conditions of a flat piston. For this purpose, the piston ring has a width which is greater than a circumferential surface of the piston, so that there is an axially projecting length, which is shaped into a spring end, and which is supported on a top side of the piston.

All the embodiments of DE 195 01 792 C2 have a circular-arc-shaped transition which is greater than 180°. One embodiment, shown in FIG. 3, has a bent-over spring end which comes to bear with its face on the top side of the piston. Some disadvantages are associated with this under unfavorable conditions. Thus, in the case of a piston ring subjected to high loading, the bent-over spring end may turn in further in the direction of the inside of the piston ring, which can result in the piston ring loading itself. Furthermore, leakages may occur on the inside of the piston ring, and these leakages, although not serious, can be measured in a damping-force chart.

Particular loads always occur at a piston ring when the piston ring is used with a piston for a piston-cylinder unit having grooves in the cylinder. The piston ring is deformed in the direction of the groove root and may possibly be squeezed at the runout of the groove. The piston disclosed in DE 36 11 288 A1 therefore has a guide ring for the radial guidance of the piston and a piston ring, and which performs the sealing function. In this complicated solution too, however, the limits of loading in modern vehicles is reached.

SUMMARY OF THE INVENTION

An object of the present invention is to realize a piston ring for a piston which removes the problems known from the prior art with regard to strength and tightness.

This and other objects are achieved according to a first embodiment of the invention in that one spring end has a circular-arc-shaped transition, which is designed to be between 90° and 180°, and this spring end comes to bear on a first top side of the piston. The other spring end having an annular bearing surface, comes to bear in the region of the opposite second top side of the piston. The other spring end, with regard to the shaping angle, is adapted to the angle between the circumferential surface and the second top side in this region. This configuration of the piston ring not only enables the spring end on the piston ring to be shaped, but also enables the piston ring to be pushed onto the piston and then fixed by the forming of the annular bearing surface. In this case, a sufficiently large axial prestress can be obtained. The orientation of the shaped ends prevents contact with the inner wall of the piston ring.

In a further advantageous embodiment, the spring end on the first top side has sections which are designed with a larger shaping angle than their adjacent sections. In order to prevent the differences in stress between the differently shaped sections from becoming too large, provision is made for the sections, with different shaping angles, to form a corrugated course of the first spring end in the peripheral direction. Thus, the sections having a smaller shaping angle support the sections having a larger shaping angle, in which case incisions between the sections which would ordinarily be subjected to a notch effect, may be dispensed with.

To increase the maximum transverse-force loading, a pressure ring is arranged between the circumferential surface of the piston and the piston ring. This pressure ring prestresses the piston ring radially against the wall to be sealed. The object is not to increase the compressive prestress of the piston ring against the wall to be sealed, but to keep the sealing force constant and if need be achieve radial compensation in the event of transverse forces.

In another embodiment, the circumferential surface has a step, on which the pressure ring is arranged. The piston may be manufactured by means of a non-cutting production process.

Alternatively, the pressure ring of the piston ring may be arranged at the level of the transverse offset in order to increase the sealing effect of the transverse offset, provided the piston ring has a joint gap with a transverse offset.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is to be explained in more detail with reference to the following description of the figures. In the drawings:

FIG. 3b is a partial interior view of the piston ring shown in FIG. 3a ; and

DETAILED DESCRIPTION OF THE PRESENTLY PREFERRED EMBODIMENTS

Figure 1:
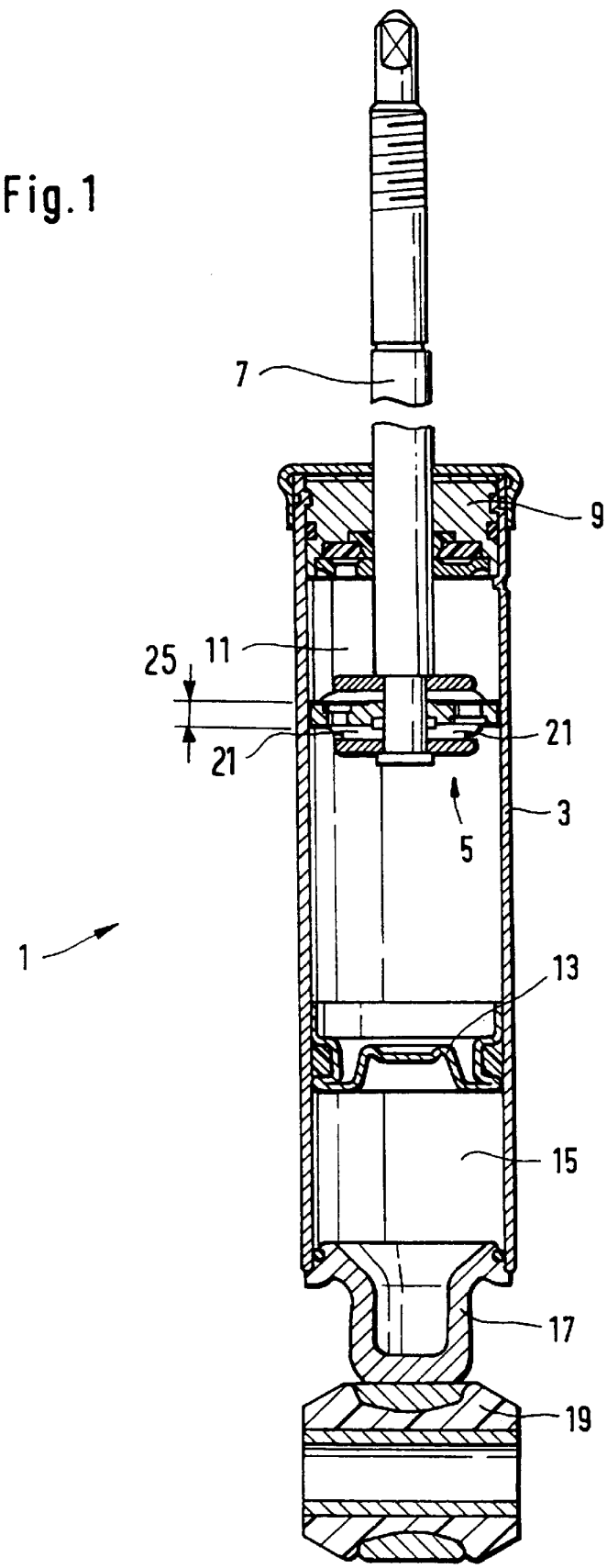
FIG. 1 is a sectional overall view of a piston/cylinder unit.

FIG. 1 shows by way of example a piston/cylinder unit 1 designed as a single-tube vibration damper. In principle, the idea behind the invention can also be utilized for other applications.

The piston/cylinder unit 1 essentially comprises a cylinder 3, in which a piston 5 is arranged on a piston rod 7 in an axially movable manner. On the exit side of the piston rod 7, a piston-rod guide 9 encloses a working space 11, which is filled with a damping medium and is separated from a gas space 15 by a separating piston 13. The gas space 15 has a base 17 at the end with a lug 19.

During a movement of the piston rod 7, damping medium is displaced through valves 21 in the piston 5. A piston ring 23, which covers a circumferential surface 25 of the piston 5, prevents lateral flow around the piston.

Figure 2A:
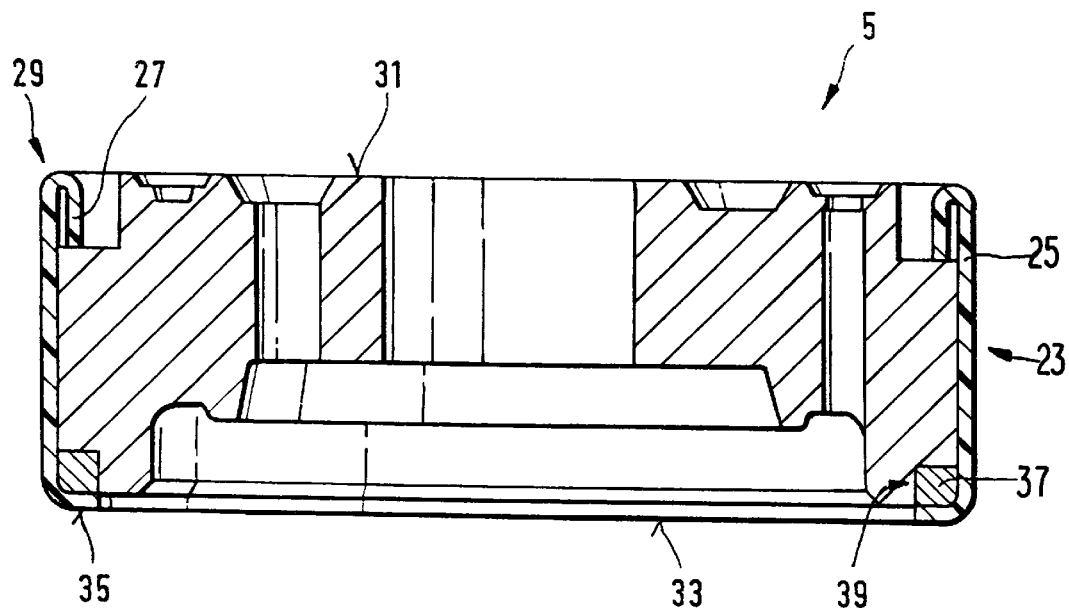
FIG. 2a is a sectional view of a piston with a piston ring in accordance with an embodiment of the invention.

FIG. 2a shows the piston 5 with the piston ring 23 as a component part. The piston in FIG. 1 being an especially flat piston and the piston in FIG. 2 being a piston having a larger overall height. However, the principle of the piston ring is identical.

The piston ring 23 is wider than the height of the circumferential surface 25 of the piston 5. As a result, there is a projecting length, which is shaped into a spring end 27. A transition 29 connects the spring end 27 to that part of the piston ring which covers the circumferential surface. The transition 29 is designed in a circular-arc shape and has a shaping angle of essentially 180°, so that the face of the spring end comes to bear on the top side 31.

The other end of the piston ring 23 is shaped in accordance with the contour of the second top surface 33. As a result, an annular bearing surface 35 is obtained. During the manufacture of the construction unit of piston/piston ring, the piston ring 23 is initially shaped having the spring end 27. The piston ring 23 is then pushed over the circumferential surface 25 of the piston 5 until the spring end comes to bear on the first top side 31. The second, projecting end of the piston ring 23 is then bent over onto the second top side 33. The piston ring is thus axially prestressed in an elastic manner.

The shaping, which is as accurate as possible, of the elastic end through 180° prevents the spring end from penetrating into the inner wall of the piston ring 23. Furthermore, due to the annular bearing surface 35, a sufficiently long sealing distance is obtained between the two top sides 31, 33 of the piston 5, so that back flushing of the piston ring 23 is impossible.

For piston rings subjected to particular stress, in particular during transverse forces, a pressure ring 37 is assigned to the piston ring 23. The pressure ring 37 exerts a radial prestressing force on the piston ring 23 and thus increases the sealing effect. As such, not only is the applied pressure kept at a defined level, but the inner wall of the piston ring also cannot be flushed from the back.

In FIG. 2a, the pressure ring 37 is restrained under the bearing surface 35 on a step 39 of the second top side 33. In accordance with this design, a piston-ring groove may be dispensed with, as a result of which the manufacturing cost of the piston is reduced. A punched and pressed piston may also be used. Furthermore, the pressure ring 37 exerts a prestressing force in the radial and axial directions and as such, axial play of the piston ring 23 is thus also counteracted.

Figure 2B:
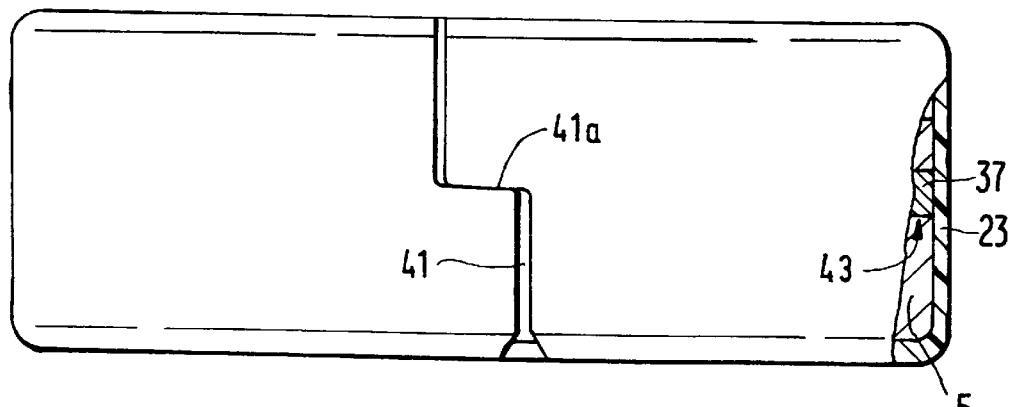
FIG. 2b is a side view of another embodiment of the piston ring according to the invention.

FIG. 2b shows an alternative embodiment, in which the pressure ring 37 is arranged inside a piston-ring groove 43 at the level of a transverse offset 41a of the joint gap 41 of the piston ring 23. At this point, since the transverse offset 41a is assisted in its sealing effect by the pressure ring 37, the pressure ring 37 can reliably seal off the unavoidable joint gap 41.

Figure 3A:
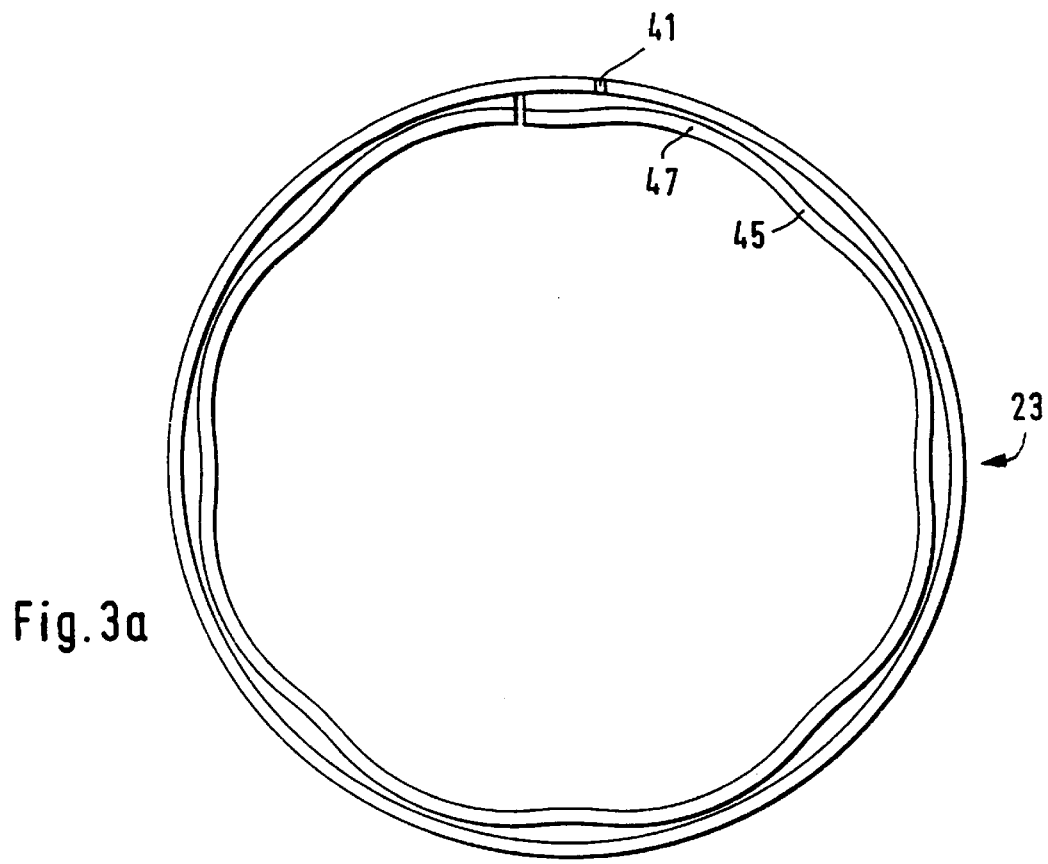
FIG. 3a is a top view of piston ring in accordance with a further embodiment of the invention.
Figure 3B:
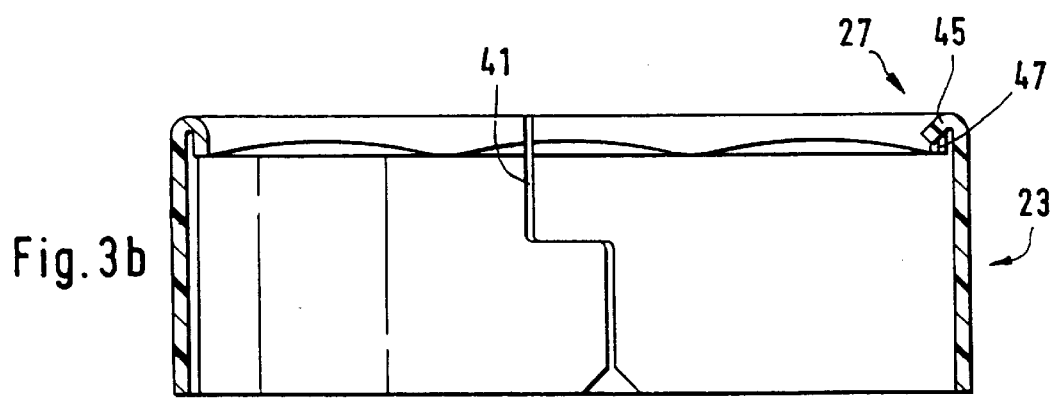
Figure 3C:
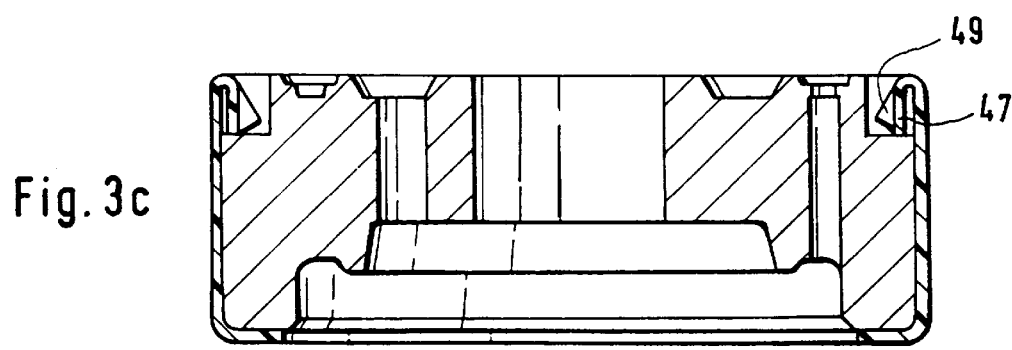
FIG. 3c is a sectional view of a piston with the piston ring of FIG. 3a mounted thereon in accordance with an embodiment of the invention.

FIGS. 3a to 3c show an embodiment of the piston ring 23 having shaped spring ends with different shaping angles in the peripheral direction, so that there are sections 45 which lie radially further to the inside than supporting sections 47 of the spring ends 27. The shaped sections 45, 47 are connected to one another except for the joint gap 41, so that the closed contour of the spring end 27 has a corrugated shape. As can be seen from FIG. 3c, the supporting section 47 can no longer be distorted in the direction of the inner wall of the piston ring.

The embodiment according to FIGS. 3a to 3c may of course also be combined with a pressure ring in accordance with the embodiment of FIGS. 2a and 2b.

The invention is not limited by the embodiments described above which are presented as examples only but can be modified in various ways within the scope of protection defined by the appended patent claims.

We claim:

1. A combination of a piston and a mounted piston ring for a piston/cylinder unit, the piston having a circumferential surface with a height, a first top side and a second top side, the mounted piston ring covering the circumferential surface of the piston and sealing it off from the cylinder, the mounted piston ring comprising:

a width greater than the height of the circumferential surface and forming an axially projecting length of the piston ring relative to the piston;

a first spring end formed by the axially projecting length and being axially supported on and bearing against said first top side of the piston, said first spring end having a circular-arc-shaped transition in a range of 90°–180°;

a second spring end forming an annular bearing surface bearing against a region of said second top side of the piston, said second spring end having a shaping angle adapted to a second angle between the circumferential surface and the second top side; and a pressure ring disposed between said circumferential surface of the piston and the piston ring, said pressure ring prestressing the piston ring radially against a cylinder wall to be sealed.

2. The combination in accordance with claim 1, wherein said first spring end comprises first sections having first shaping angles and second sections having second shaping angles, said first shaping angles being larger than said second shaping angles.

3. The combination in accordance with claim 2, wherein said first and second sections having different first and second shaping angles form a corrugated course of said first spring end in a peripheral direction.

4. The combination piston ring in accordance with claim 1, wherein the circumferential surface comprises a step, said pressure ring being arranged on said step.

5. The combination in accordance with claim 3, further comprising a joint gap having a transverse offset, said pressure ring being arranged at a level of said transverse offset.

* * * * *